United States Patent
Ham et al.

(10) Patent No.: US 10,238,217 B2
(45) Date of Patent: Mar. 26, 2019

(54) METHOD AND APPARATUS FOR WELDING 3D BELLOWS, AND BELLOWS

(71) Applicants: Eui-Shin Ham, Yongin (KR); Woo-Sung Ham, Seoul (KR)

(72) Inventors: Eui-Shin Ham, Yongin (KR); Woo-Sung Ham, Seoul (KR)

(*) Notice: Subject to any disclaimer, the term of this patent is extended or adjusted under 35 U.S.C. 154(b) by 709 days.

(21) Appl. No.: 14/893,053

(22) PCT Filed: Aug. 21, 2014

(86) PCT No.: PCT/KR2014/007754
§ 371 (c)(1),
(2) Date: Nov. 21, 2015

(87) PCT Pub. No.: WO2015/030419
PCT Pub. Date: Mar. 5, 2015

(65) Prior Publication Data
US 2016/0113411 A1    Apr. 28, 2016

(30) Foreign Application Priority Data

Aug. 27, 2013 (KR) .......................... 10-2013-0101715

(51) Int. Cl.
*A47C 27/08*    (2006.01)
*A47C 27/00*    (2006.01)
(Continued)

(52) U.S. Cl.
CPC .......... *A47C 27/087* (2013.01); *A47C 27/081* (2013.01); *B29C 65/18* (2013.01);
(Continued)

(58) Field of Classification Search
CPC ..... A47C 27/08; A47C 27/081; A47C 27/082; A47C 27/083; A47C 27/084;
(Continued)

(56) References Cited

U.S. PATENT DOCUMENTS 2,269,342 A * 1/1942 Johnson ............... A47C 27/128
156/289
2,703,770 A * 3/1955 Melzer ...................... B32B 3/12
156/289
(Continued)

FOREIGN PATENT DOCUMENTS

JP    06-255005 A    9/1994
JP    08-301035 A    11/1996
(Continued)

*Primary Examiner* — Robert G Santos
(74) *Attorney, Agent, or Firm* — Patent Office of Dr. Chung Park (57) ABSTRACT

The present invention relates to a method for welding a 3D bellows. The method includes: repeatedly laminating a unit cell material, a second adhesion-preventing film, a different unit cell material, and a first adhesion-preventing film; forming ventilation holes on the unit cell materials by pressing a hole-processing cutter on which a hole-circumference welding heater is installed onto the laminated unit cell materials and the first adhesion-preventing films, and then heating the circumference of the ventilation holes; finishing two sides of the unit cells by positioning, on two outermost surfaces of the laminated unit cell materials, a first finishing unit cell material and a second finishing unit cell material provided with an air injection port; and cutting the first finishing unit cell material, the unit cell materials, and the second finishing unit cell material and heating the periphery of the cut area by pressing a contour-processing cutter.

1 Claim, 7 Drawing Sheets

(51) Int. Cl.
*B29C 65/18* (2006.01)
*B29C 65/74* (2006.01)
*B29C 65/00* (2006.01)
*B29L 22/02* (2006.01)
*B29L 31/00* (2006.01)

(52) U.S. Cl.
CPC ...... *B29C 65/7437* (2013.01); *B29C 65/7441* (2013.01); *B29C 66/004* (2013.01); *B29C 66/1122* (2013.01); *B29C 66/137* (2013.01); *B29C 66/21* (2013.01); *B29C 66/24244* (2013.01); *B29C 66/43* (2013.01); *B29C 66/4326* (2013.01); *B29C 66/47* (2013.01); *B29C 66/532* (2013.01); *B29C 66/61* (2013.01); *B29C 66/729* (2013.01); *B29C 66/73921* (2013.01); *B29C 66/8322* (2013.01); *B29C 2793/009* (2013.01); *B29L 2022/02* (2013.01); *B29L 2031/703* (2013.01); *B29L 2031/751* (2013.01)

(58) Field of Classification Search
CPC ..... A47C 27/087; A47C 27/088; A47C 27/10; A61G 7/05769; A61G 7/05776
USPC ........... 5/711, 706, 710, 712, 713, 644, 654, 5/655.3
See application file for complete search history.

(56) References Cited

U.S. PATENT DOCUMENTS

| | | | | |
|---|---|---|---|---|
| 5,022,109 A * | 6/1991 | Pekar | .................. | A47C 27/081 5/706 |
| 5,144,708 A * | 9/1992 | Pekar | .................. | F16K 15/202 137/223 |
| 5,564,143 A * | 10/1996 | Pekar | .................. | A47C 27/081 137/846 |
| 5,638,565 A * | 6/1997 | Pekar | ..................... | A47C 4/54 5/653 |
| 5,647,078 A * | 7/1997 | Pekar | .................. | A47C 27/083 5/706 |
| 5,711,575 A * | 1/1998 | Hand | .................... | A47C 7/425 297/284.6 |
| 5,902,011 A * | 5/1999 | Hand | .................... | A47C 7/425 297/284.6 |
| 2016/0113411 A1* | 4/2016 | Ham | .................... | A47C 27/081 5/711 |

FOREIGN PATENT DOCUMENTS

| | | |
|---|---|---|
| KR | 10-2009-0096204 A | 9/2009 |
| KR | 10-2010-0090784 A | 8/2010 |
| KR | 10-2011-0143626 A | 7/2013 |
| KR | 10-2013-0075307 A | 7/2013 |

* cited by examiner

METHOD AND APPARATUS FOR WELDING 3D BELLOWS, AND BELLOWS

CROSS-REFERENCE TO PRIOR APPLICATIONS

This application is a national Stage Patent Application of PCT International Patent Application No. PCT/KR2014/007754, filed on Aug. 21, 2014 under 35 U.S.C. § 371, which claims priority of Korean Patent Application No. 10-2013-0101715, filed on Aug. 27, 2013, which are all hereby incorporated by reference in their entirety.

BACKGROUND OF THE INVENTION

Field of the Invention

The present invention relates to a method and an apparatus for welding a 3D bellows, and the bellows, and more particularly, to a method and an apparatus for welding a 3D bellows that is composed of a plurality of unit cells by connecting a plurality of unit cell materials laminated by two-time thermal welding work, in which the unit cells are connected by baffles and the insides of the unit cells are connected, and to the bellows.

Description of the Conventional Art

In general, an air mattress can be expanded by injecting air and folded and easily kept by discharging air, so it can be used not only for bed at home, but at various places such as a floor of a camping place, a medical bed, a narrow rest space in a ship, and an outdoor rest place, and a waterside excursion.

The most important issue when using an air mattress is whether it can support a body by distributing load throughout the entire area without a specific portion of the entire area, where load is applied, giving in, and whether air can be smoothly injected and discharged.

In a common air mattress structure of the related art, the entire inside is formed by a single space (unit cell) and a plurality of baffles is attached with regular intervals in the single space.

The baffles are composed of main baffles bonded by an adhesive to the upper side and the lower side in the single space of the air mattress, upper sub-baffles bonded to a side of the upper ends of the main baffles and the upper side of the single space, and lower sub-bafflers bonded to a side of the lower ends of the main baffles and the lower side of the single space.

The baffles prevents air from keeping expanding up and down by holding the upper end and the lower end of the mattress when air is injected into the single space of the air mattress.

However, since the inside of the air mattress is formed by a single space, when external pressure (for example, body weight) is applied to a specific area of the air mattress, the air in the air mattress moves to the other portions except for the specific area where the external pressure is applied and the specific area of the air mattress gives in, so it cannot uniformly and elastically support the body of the user.

Further, a plurality of baffles are manually bonded to the upper and lower sides in the air mattress, many work processes are required and work time is too long, so workability is deteriorated, and accordingly, productivity for mass production reduces and the manufacturing cost increases.

In order to solve this problem, the applicant(s) has proposed "Air mattress and, equipment and method for manufacturing the same" (Korean Patent Application No. 10-2011-0143626).

According to this air mattress, an upper cover member fabric and an lower cover member fabric are supplied in one direction with a predetermined gap therebetween, baffle holes are formed with regular intervals through the upper cover member fabric and the lower cover member fabric, and baffle wicks having a predetermined length are inserted into the baffle holes in the upper and lower cover member fabric.

Further, the upper ends and lower ends of the baffle wicks protruding over the outer surfaces of the upper and lower cover member fabrics through the baffle holes in the upper and lower cover members are attached to the outer surfaces of the upper and lower cover members, the edges of the upper and lower cover members are sewn, and then a plurality of air tubes are put between the baffle wicks in the upper and lower cover members.

However, the air mattress of the related art is manufactured through many steps, as described above, a step of forming baffle holes in the upper cover member fabric and the lower cover member fabric, a step of inserting baffle wicks into the baffle holes, a step of bonding the upper and lower ends of the baffle wicks to the upper cover member fabric and the lower cover member fabric, a step of sewing the edges of the upper cover member and the lower cover member, and a step of putting air tubes between the baffle wicks, so the manufacturing process is still complicated and the manufacturing cost is increased accordingly.

Further, the thermal welding method of the related art is a method of transmitting heat up and down to an XY plane using high frequency waves, ultrasonic waves, and an induction heater, so there is a limit in simultaneously welding a plurality of laminated mother materials or welding a thick mother material.

That is, the thermal welding method of the related art is not a method of horizontally transmitting heat in a Z-direction, so there is a limit in melting a plurality of laminated mother materials at a time or welding a thick mother material.

SUMMARY OF THE INVENTION

An object of the present invention for solving the problems is to provide a method and an apparatus for welding a 3D bellows in which a plurality of unit cells is manufactured by two-time thermal welding because a plurality of laminated mother materials is welded by transmitting heat horizontally in a Z-direction, the unit cells are connected to baffles, and the insides of the unit cells are connected to each other, and the bellows.

In order to achieve the object, a 3D bellows of the present invention includes: a first finishing unit cell material that is disposed on a side of both outermost sides of unit cells and finishes an outermost side of the unit cells; unit cell materials that are laminated on the top of the first finishing unit cell material to fit to the number of unit cells to be manufactured and each have a ventilation hole; a second finishing unit cell material that is disposed on the other side of the outermost sides of the unit cells and finishes the other outermost side of the unit cells; an air injection hole that is formed at the second finishing unit cell material to inject/discharge air into/out of the unit cells; first adhesion-preventing films that are disposed around the ventilation hole of the unit cell materials, are disposed not in all gaps between the unit cell materials, but alternately between the unit cell materials, and prevent thermal welding of the circumferences of the ventilation holes of two unit cell materials adjacent up and down when the circumferences of the ventilation holes are heated; and second adhesion-preventing films that are disposed around the unit cell materials, are disposed not in all gap between the unit cell materials, but alternately between the unit cell materials, where the first adhesion-preventing films are not disposed, and prevent thermal welding of the circumferences of two unit cell materials adjacent up and down when the circumferences of the unit cell materials are heated.

In order to achieve the object of the present invention, an apparatus for welding a 3D bellow includes: a hole-processing cutter that forms ventilation holes in unit cell materials and a first adhesion-preventing film by punching portions where two unit cell materials, the first adhesion-preventing film, and other two unit cell materials are repeatedly laminated; a hole-circumference welding heater that is disposed on the hole-processing cutter to heat the hole-processing cutter and welds peripheries of the ventilation of two adjacent unit cell materials that are not blocked by the first adhesion-preventing film by transmitting heat to the circumferences of the ventilation holes punched by the hole-processing cutter; a contour-processing cutter that is disposed at side of the hole-processing cutter and cuts circumferences of a first finishing unit cell material, the unit cell materials, a second adhesion-preventing film, and a second finishing unit cell material, along the contours of the unit cells; and a contour welding heater that is disposed on the contour-processing cutter to heat the contour-processing cutter, and welds contours of the first finishing unit cell material, the unit cell material, and the second finishing unit cell material that are not blocked by the second adhesion-preventing film by transmitting heat to contours of the first finishing unit cell material, the unit cell materials, and the second finishing unit cell material that are punched by the contour-processing cutter.

In order to achieve the object of the present invention, a method of welding a 3D bellows includes: (a) preparing a unit cell material forming a side of t unit cell; (b) seating a second adhesion-preventing film on a unit cell material forming the contour of the unit cell; (c) seating another unit cell material on the second adhesion-preventing film; (d) seating a first adhesion-preventing film on the another unit cell material where a ventilation hole is formed; (e) sequentially laminating the unit cell material, the second adhesion-preventing film, the another unit cell material, and the first adhesion-preventing film by repeating the steps of (a) to (d) as many as the number of unit cells to be manufactured; (f) forming ventilation holes in the unit cell materials by pressing a hole-processing cutter having a hole-circumference welding heater to the laminated unit cell materials and first adhesion-preventing films; (g) welding peripheries of the ventilation holes of two adjacent unit cell materials that are not blocked by the first adhesion-preventing film by heating the circumferences of the ventilation holes by heating the hole-processing cutter with the hole-circumference welding heater; (h) finishing both sides of the unit cells by positioning a first finishing unit cell material and a second finishing unit cell material having an air injection hole to both outermost sides of the laminated unit cell materials; (i) cutting the first finishing unit cell material, the unit cell materials, and the second finishing unit cell material along the contours of the unit cells by heating the contour-processing cutter having the contour welding heater to the laminated first finishing unit cell material, unit cell materials, second adhesion-preventing films, and second finishing unit cell material; and (j) welding the contours of two adjacent unit cell materials that are not blocked by the second adhesion-preventing film by heating the circumferences of the cut first finishing unit cell material, unit cell materials, and second finishing unit cell material by heating the contour-processing cutter with the contour welding heater.

According to the present invention, since the unit cell material, the second adhesion-preventing film, the another unit cell material, and the first adhesion-preventing film are repeatedly laminated as many as the number of unit cells to be manufactured, ventilation holes are formed in the unit cell materials by pressing a hole-processing cutter having a hole-circumference welding heater to the laminated unit cell materials and first adhesion-preventing films, and then the circumferences of the ventilation holes are heated, peripheries of the ventilation holes of two adjacent unit cell materials that are not blocked by the first adhesion-preventing film are welded to each other. Further, since both sides of the unit cells are finished by positioning a first finishing unit cell material and a second finishing unit cell material having an air injection hole to both outermost sides of the laminated unit cell materials, the first finishing unit cell material, the unit cell materials, and the second finishing unit cell material are cut along the contours of the unit cells by pressing the contour-processing cutter, and the cut circumferences are heated, the contours of two adjacent unit cell materials that are not blocked by the second adhesion-preventing film are welded to each other. Accordingly, a plurality of unit cells is formed, the unit cells are bonded, and the insides of the unit cells communicate with each other, by the work or laminating the unit cell material, the first adhesion-preventing film, the second adhesion-preventing film, the first finishing unit cell material, and the second finishing unit cell material, the work of punching ventilation holes, and the work of punching contours. Therefore, by two-time punching work, not only a plurality of unit cells is manufactured and the unit cells are bonded to each other, but the insides of the unit cells are connected to each other, so mass production is possible and the manufacturing cost can be significantly reduced.

DETAILED DESCRIPTION OF THE PREFERRED EMBODIMENT

Detailed features and advantages of the present invention will be made clearer from the following description referring to the accompanying drawings.

Figure 1:
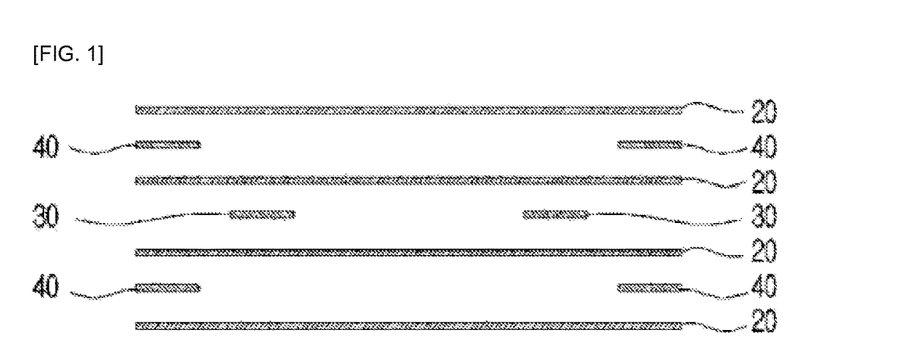
FIG. 1 is a schematic cross-sectional view in which some of cell materials and films for manufacturing a 3D bellows of the present invention are separated.
Figure 2:
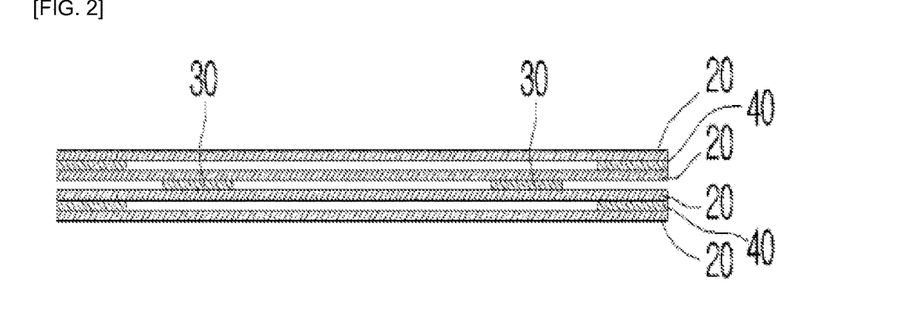
FIG. 2 is a schematic cross-sectional view showing a state in which the cell materials and the films of FIG. 1 are in close contact with each other.
Figure 3:
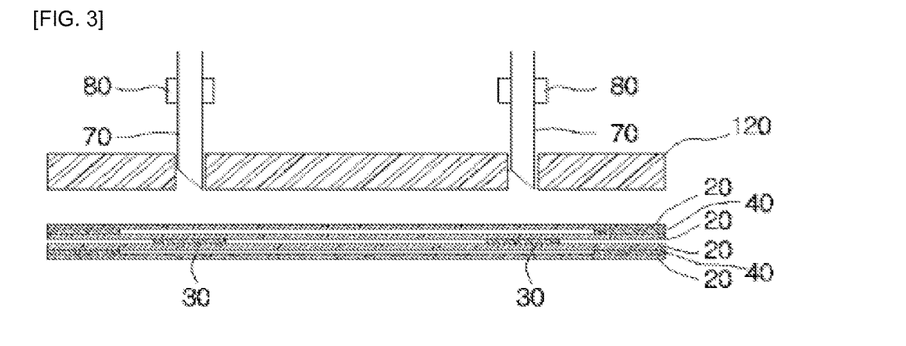
FIG. 3 is a schematic cross-sectional view showing a hole-processing cutter for forming ventilation holes.
Figure 4:
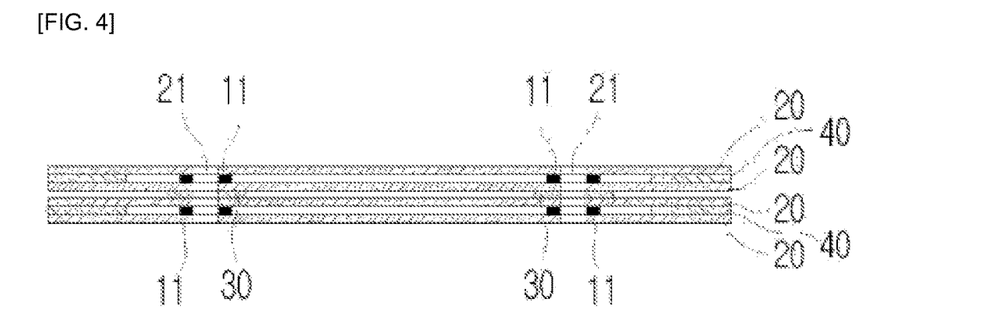
FIG. 4 is a schematic cross-sectional view showing a state in which ventilation holes are formed by a hole-processing cutter and a hole-circumference welding heater and then a hole-circumference welding portion is formed around the ventilation holes of unit cells being in contact with each other without a first adhesion-preventing film.
Figure 5:
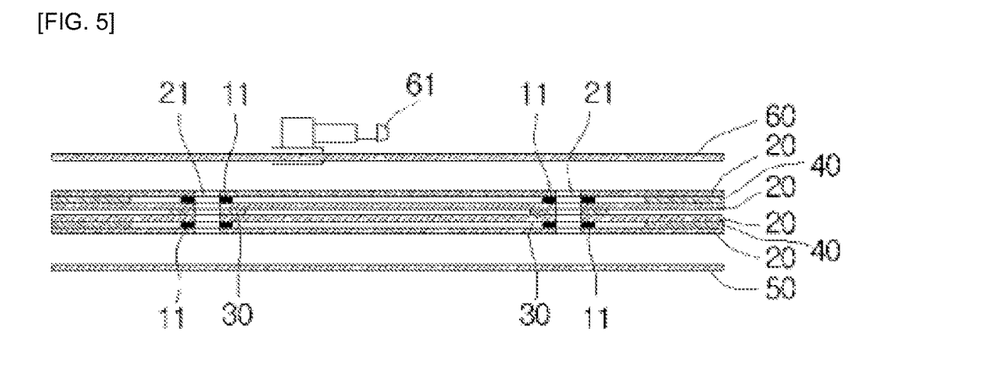
FIG. 5 is a schematic cross-sectional view showing a state in which a first finishing unit cell material and a second finishing unit cell material are positioned on both sides of FIG. 4.
Figure 6:
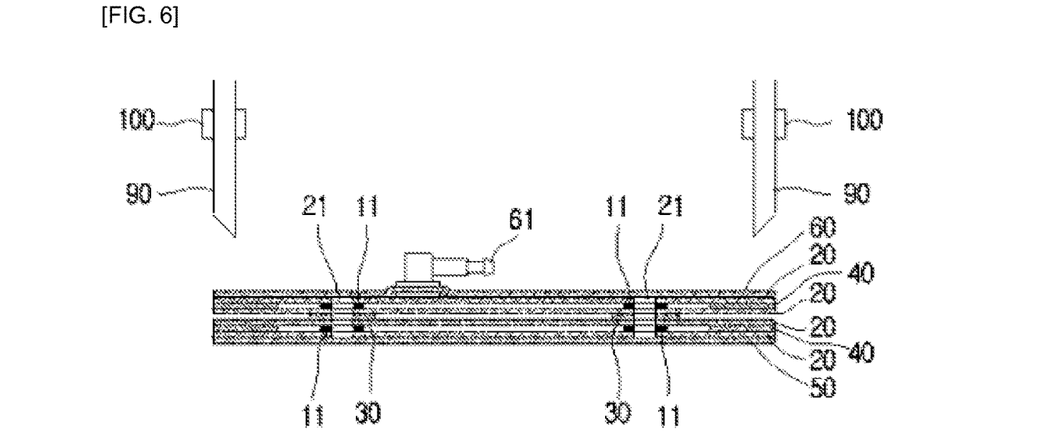
FIG. 6 is a schematic cross-sectional view showing a state in which the first finishing unit cell material and the second finishing unit cell material are in close contact with each other and the contour is ready for cutting to fit to the shapes of the unit cells.
Figure 7:
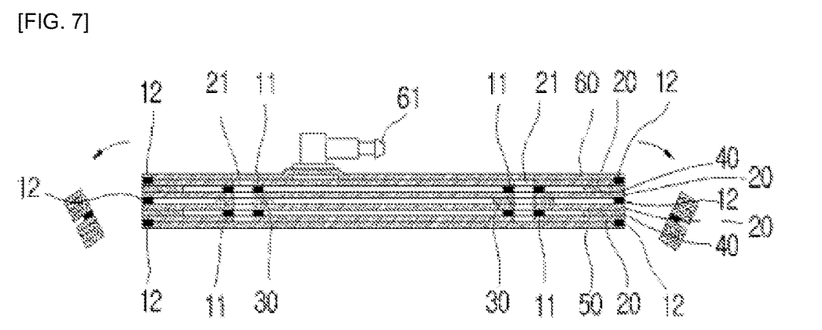
FIG. 7 is a schematic cross-sectional view showing a state in which a contour welding portion is formed around the contour of the unit cell materials being in contact with each other without a second adhesion-preventing film after the periphery of unit cells is cut.
Figure 8:
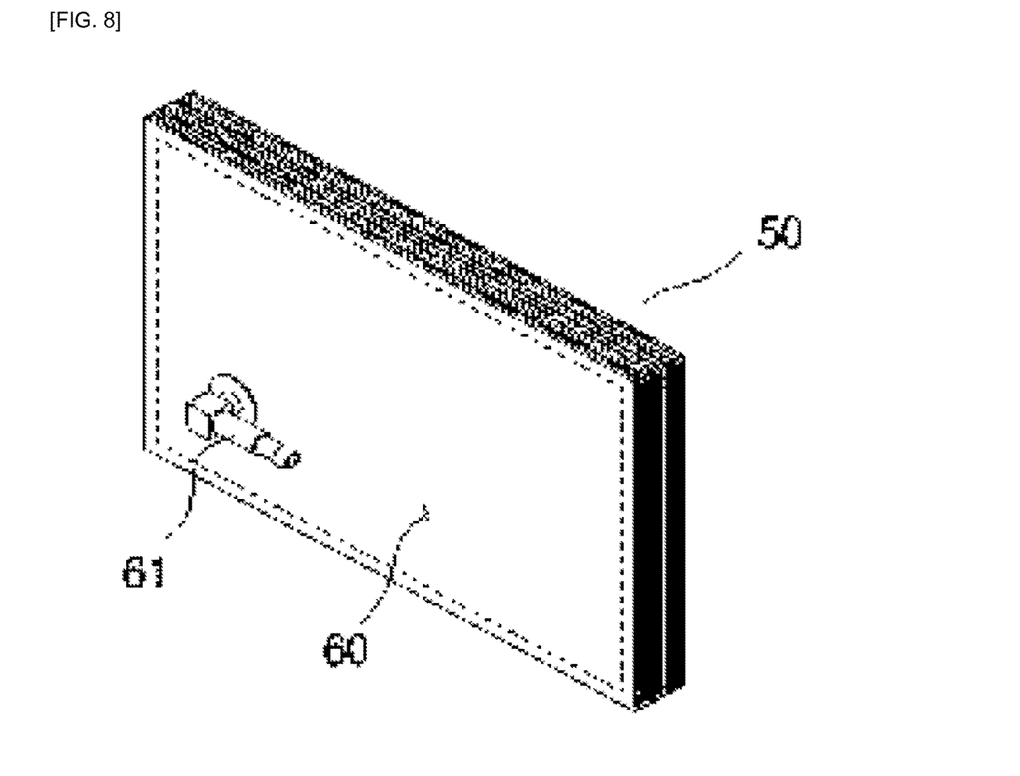
FIG. 8 is a schematic perspective view showing a state in which manufacturing is finished.
Figure 9:
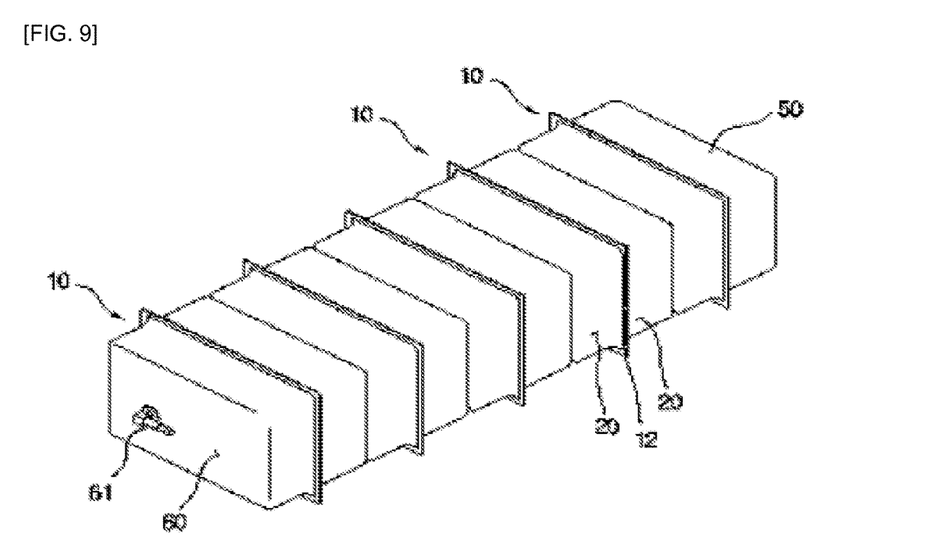
FIG. 9 is a schematic perspective view showing a state in which air is injected into unit cells.
Figure 10:
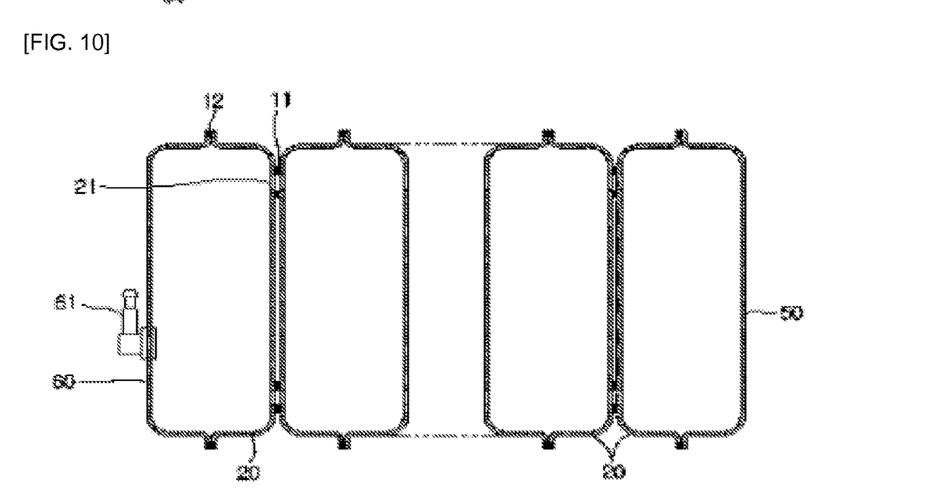
FIG. 10 is a cross-sectional view of FIG. 9.

FIG. 1 is a schematic cross-sectional view in which some of cell materials and films for manufacturing a 3D bellows of the present invention are separated, FIG. 2 is a schematic cross-sectional view showing a state in which the cell materials and the films of FIG. 1 are in close contact with each other, and FIG. 3 is a schematic cross-sectional view showing a hole-processing cutter for forming ventilation holes. FIG. 4 is a schematic cross-sectional view showing a state in which ventilation holes are formed by a hole-processing cutter and a hole-circumference welding heater and then a hole-circumference welding portion is formed around the ventilation holes of unit cells being in contact with each other without a first adhesion-preventing film, FIG. 5 is a schematic cross-sectional view showing a state in which a first finishing unit cell material and a second finishing unit cell material are positioned on both sides of FIG. 4, FIG. 6 is a schematic cross-sectional view showing a state in which the first finishing unit cell material and the second finishing unit cell material are in close contact with each other and the contour is ready for cutting to fit to the shapes of the unit cells, FIG. 7 is a schematic cross-sectional view showing a state in which a contour welding portion is formed around the contour of the unit cell materials being in contact with each other without a second adhesion-preventing film after the periphery of unit cells are cut, FIG. 8 is a schematic perspective view showing a state in which manufacturing is finished, FIG. 9 is a schematic perspective view showing a state in which air is injected into unit cells, and FIG. 10 is a cross-sectional view of FIG. 9.

A 3D bellows of the present invention includes a plurality of unit cells 10 that are welded to each other by two-time punching work, in which the unit cells 10 are composed of a unit cell materials 20, a first adhesion-preventing film 30, a second adhesion-preventing film 40, a first finishing unit cell material 50, and a second finishing unit cell material 60.

The unit cell materials 20 are laminated on the top of the first finishing unit cell material 50 to fit to the number of the unit cells 10 to be manufactured and each have a ventilation hole 21.

The first adhesion-preventing film 30 is disposed around the ventilation hole 21 of the unit cell material 20, is disposed alternately between the unit cell materials 20, and prevents the circumferences of the ventilation holes 20 of two unit cell materials 20 adjacent up and down from being thermally welded when the circumferences of the ventilation holes 21 are heated.

The first adhesion-preventing film 30 is alternately disposed with a second adhesion-preventing film 40 to be described below between the unit cell materials 20, as shown in FIG. 1, when the second adhesion-preventing film 40 is disposed between the first and second unit cell materials 20 from the bottom, the first adhesion-preventing film 30 is disposed between the second and the fourth unit cell materials 20, and in this way, the first adhesion-preventing film 30 and the second adhesion-preventing film 40 are alternately disposed between the unit cell materials 20 to fit to the number of the unit cell materials 20.

The second adhesion-preventing film 40 is disposed around the unit cell material 20, is disposed alternately between the unit cell materials 20 where the first adhesion-preventing film 30 is not disposed, not in all gaps between the unit cell materials 20, and prevents the contours of two unit cell materials 20 adjacent up and down from being thermally welded when the contours of the unit cell materials 20 are heated.

The second adhesion-preventing film 40 is alternately disposed with the first adhesion-preventing film 30 between the unit cell materials 20, as shown in FIG. 1, when the second adhesion-preventing film 40 is disposed between the first and second unit cell materials 20 from the bottom, the first adhesion-preventing film 30 is disposed between the second and the fourth unit cell materials 20, and in this way, the first adhesion-preventing film 30 and the second adhesion-preventing film 40 are alternately disposed between the unit cell materials 20 to fit to the number of the unit cell materials 20.

The first finishing unit cell material 50 is disposed on a side of both outermost sides of the unit cells 10 and finishes an outermost side of the unit cells 10.

The second finishing unit cell material 60 is disposed on the other side of both outermost sides of the unit cells 10 and finishes the other outermost side of the unit cells 10. Accordingly, both outermost sides of the unit cells are finished by the first finishing unit cell material 50 and the second finishing unit cell material 60, so the spaces between the unit cells 10 are sealed.

An air injection hole 61 is formed at the second finishing unit cell material 60 and air is injected/discharged into/out of the unit cells 10.

The unit cells 10 for a 3D bellows of the present invention are manufactured by a 3D bellow welding device. The 3D bellow welding device includes a hole-processing cutter 70, a hole-circumference welding heater 80, a contour-processing cutter 90, and a contour welding heater 100.

The hole-processing cutter 70 forms ventilation holes 21 through the unit cell materials 20 and the first adhesion-preventing films 30 by punching the portion where two unit cell materials 20, the first adhesion-preventing film 30, and other two unit cell material 20 are laminated.

The hole-circumference welding heater 80 is disposed on the hole-processing cutter 70 to heat the hole-processing cutter 70 and welds the peripheries of the ventilation holes of the two adjacent unit cell materials 20 that is not blocked by the first adhesion-preventing film 30 by transmitting heat to the circumferences of the ventilation holes 21 punched by the hole-processing cutter 70.

FIG. 4 is a schematic cross-sectional view showing a state in which ventilation holes 21 are formed by the hole-processing cutter 70 and the hole-circumference welding heater 80 and then hole-circumference welding portions 11 are formed around the ventilation holes 21.

When the unit cell materials 20 and the first adhesion-preventing film 30 are punched by the hole-processing cutter 70, the ventilation holes 21 are formed in them. After the hole-processing cutter 70 punches them, the hole-circumference welding heater 80 is operated and heats the circumferences of the punched ventilation holes 21, the circumferences of the ventilation holes 21 are melted.

In this state, the peripheries of the ventilation holes 21 of the second and third unit cell materials 20 are blocked by the first adhesion-preventing film 30. Accordingly, even though the ventilation holes 21 are melted by the hole-circumference welding heater 80, the peripheries of the ventilation holes 21 of the second and third unit materials are not welded to each other.

On the other hand, the peripheries of the ventilation holes 21 of the first and second unit cell materials 20 and the peripheries of the ventilation holes 21 of the third and fourth unit cell materials 20 are not blocked by the first adhesion-preventing film 30. Accordingly, when the peripheries of the ventilation holes 21 are melted, they are weld to each other and the hole-circumference welding portions 11 are formed between them.

The contour processing cutter 90 is disposed at a side of the hole-processing cutter 70 and cuts the circumferences of the first finishing unit cell material 50, the unit cell materials 20, the second adhesion-preventing film 40, and the second finishing unit cell material 60 along the contours of the unit cells 10.

The contour welding heater 100 is disposed on the contour-processing cutter 90 to heat the contour-processing cutter 90 and welds the contours of the first finishing unit cell material 50, the unit cell material 20, and the second finishing unit cell material 60 that are not blocked by the second adhesion-preventing film 40 by transmitting heat to the contours of the first finishing unit cell material 50, the unit cell materials 20, and the second finishing unit cell material 60 that are punched by the contour-processing cutter 90.

FIG. 7 is a schematic cross-sectional view showing a state in which a contour welding portion 12 is formed at the contour of the unit cell material 20 after the contour of the unit cell material 20 is cut.

When the contour-processing cutter 90 is operated and the first finishing unit cell material 50, the unit cell materials 20, the second adhesion-preventing film 40, and the second finishing unit cell material 60 are punched, the circumferences are cut along the contour of the unit cell 10.

When the contour welding heater 100 is operated and heats the contours of the first finishing unit cell material 50, the second finishing unit cell material 60, and the unit cell materials 20 after punching by the contour-processing cutter 90, the cut contours are melted. In this state, the unit cell materials 20 at the upper and lower portions where the second adhesion-preventing film 40 are not welded to each other, even though their contours are melted.

However, the contours of two sides being in contact with each other because there is not provided the second adhesion-preventing film 40 are melted and welded to each other.

The welded portion and the non-welded portion are described hereafter with reference to FIG. 7.

Since the second adhesion-preventing film 40 is not disposed between the first finishing unit cell material 50 and the unit cell material 20 over it, they are welded when the contours are heated.

Since the second adhesion-preventing film 40 is disposed between the first unit cell material 20 and the second unit cell material 20 and between the third unit cell material 20 and the fourth unit cell material 20, they are not welded to each other even if their contours are melted.

However, since the second adhesion-preventing film 40 is disposed between the second unit cell material 20 and the third unit cell material 20, they are welded when the contours are heated.

Further, since the second adhesion-preventing film 40 is not disposed between the fourth unit cell material 20 and the second finishing unit cell material 60, they are welded when the contours are heated.

The 3D bellows of the present invention is manufactured as follows.

First, unit cell materials 20 that for a side of the unit cell 10 are prepared.

The second adhesion-preventing film 40 is seated on a unit cell material 20 that forms the contour of the unit cell 10 when the unit cell material 20 are prepared.

Another unit cell material 20 is seated on the second adhesion-preventing film 40.

When the unit cell material 20, the second adhesion-preventing film 40, and another unit cell material 20 are sequentially seated, the first adhesion-preventing film 30 is seated on another unit cell material 20 where ventilation holes 21 are formed.

According to the present invention, it is possible to increase the number of the unit cells 10 by repeatedly laminating the laminated structure described above as many as the number of the unit cells 10 to be manufactured. That is, it is possible to repeatedly laminate the unit cell material 20, the second adhesion-preventing film 40, another unit cell material 20, and the first adhesion-preventing film 30 to fit to the number of the unit cells 10 to be manufactured.

When a plurality of cell materials and films are laminated, the cell materials and films are pressed and supported by a pressing cushion 120, and ventilation holes 21 are formed in the unit cell materials 20 by pressing the hole-processing cutter 70 having the hole-circumference welding heater 80 to the laminated unit cell materials 20 and first adhesion-preventing films 30.

Since the circumference of the ventilation hole 21 is heated by heating the hole-processing cutter 70 with the hole-circumference welding heater 80, so the peripheries of ventilation holes 21 of two adjacent unit cell materials 20 that are not blocked by the first adhesion-preventing film 30 are welded to each other.

When the peripheries of the ventilation holes 21 of unit cell materials 20 being in close contact with each other are welded, both sides of the unit cells 10 are finished by positioning the first finishing unit cell material 50 and the second finishing unit cell material 60 having the air injection hole 61 to both outermost sides of the laminated unit cell materials 20.

When the first finishing unit cell material 50 and the second finishing unit cell material 60 are positioned on both outermost sides of the unit cell materials 20, they are pressed and supported by the pressing cushion 120, and the first finishing unit cell material 50, the unit cell materials 20, and the second finishing unit cell material 60 are cut along the contours of the unit cells 10 by pressing the contour-processing cutter 990 having the contour welding heater 100 to the laminated first finishing unit cell material 50, unit cell materials 20, second adhesion-preventing films 40, and the second finishing unit cell material 60.

When the contours of the cell materials are cut, the peripheries of the cut first finishing unit cell material 50, unit cell materials 20, and second finishing unit cell material 60 are heated by heating the contour-processing cutter 90 with the contour welding heater 100, so the contours of two adjacent unit cell materials 20 that are not blocked by the second adhesion-preventing film 40 are welded to each other.

The 3D bellows of the present invention has the following effects.

In the present invention, a unit cell material 20, the second adhesion-preventing film 40, another unit cell material 20, and the first adhesion-preventing film 30 are repeatedly laminated as many as the number of the unit cells 10 to be manufactured. Ventilation holes 21 are formed in the unit cell materials 20 by pressing the hole-processing cutter 70 having the hole-circumference welding heater 80 to the laminated unit cell materials 20 and first adhesion-preventing film 30 and then the circumferences of the ventilation holes 21 are heated, so the peripheries of the ventilation holes 21 of two adjacent unit cell materials 20 that are not blocked by the first adhesion-preventing film 30 are welded to each other. Both sides of the unit cells 10 are finished by positioning the first finishing unit cell material 50 and the second finishing unit cell material 60 having the air injection hole 61 to both outermost sides of the laminated unit cell materials 20, and then the first finishing unit cell material 50, the unit cell materials 20, and the second finishing unit cell material 60 are cut along the contours of the unit cells 10 by pressing the contour-processing cutter 80 and the cut circumferences are heated, so the peripheries of two unit cell materials 20 that are not blocked by the second adhesion-preventing film 40 are welded to each other.

Accordingly, a plurality of unit cells 10 is formed, the unit cells 10 are bonded, and the insides of the unit cells 10 communicate with each other, by the work or laminating the unit cell material 20, the first adhesion-preventing film 30, the second adhesion-preventing film 40, the first finishing unit cell material 50, and the second finishing unit cell material 60, the work of punching ventilation holes 21, and the work of punching contours.

Accordingly, by two-time punching work, not only a plurality of unit cells 10 is manufactured and the unit cells 10 are bonded to each other, but the insides of the unit cells 10 are connected to each other, so mass production is possible and the manufacturing cost can be significantly reduced.

Figure 11:
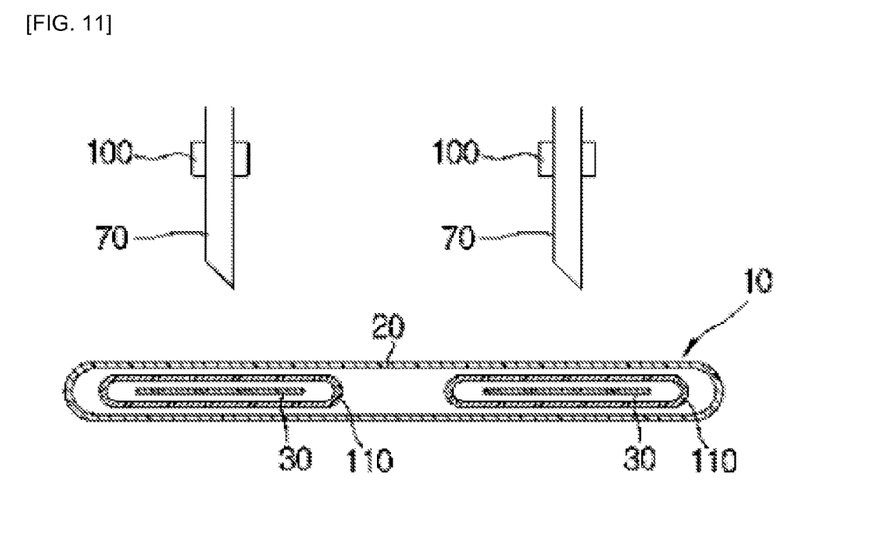
FIG. 11 is a schematic cross-sectional view showing another embodiment of the present invention.
Figure 12:
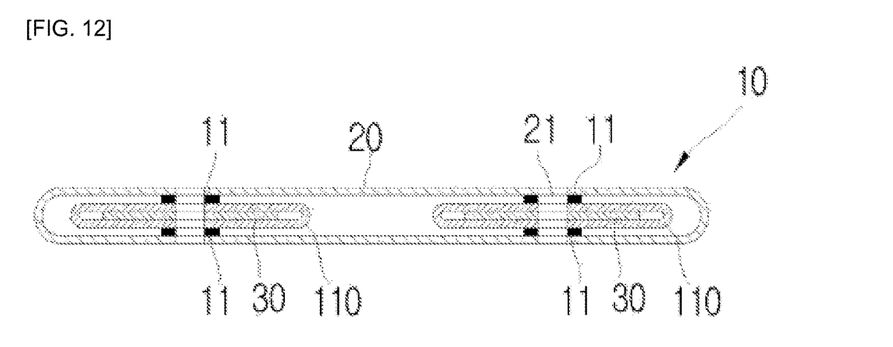
FIG. 12 is a schematic cross-sectional view showing a state in which the periphery of a ventilation hole is welded after the ventilation hole is formed by a hole-processing cutter.
Figure 13:
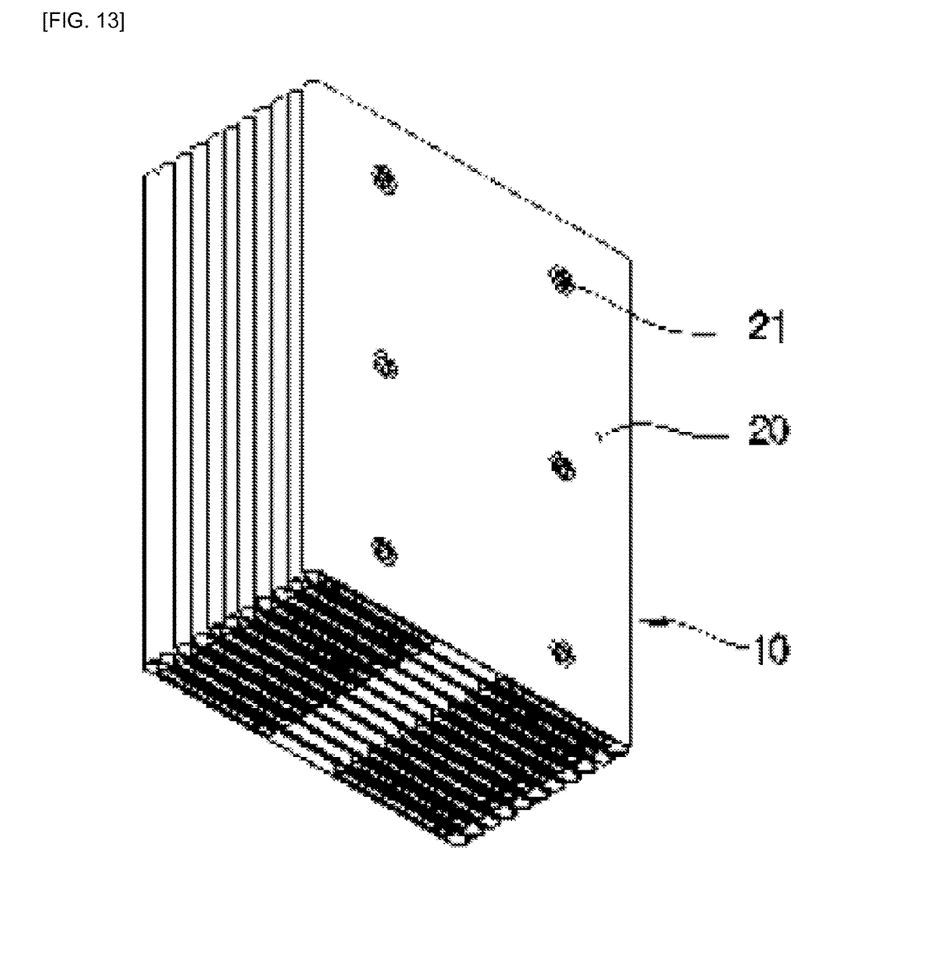
FIG. 13 is a schematic perspective view showing a state in which a plurality of unit cells is laminated.
Figure 14:
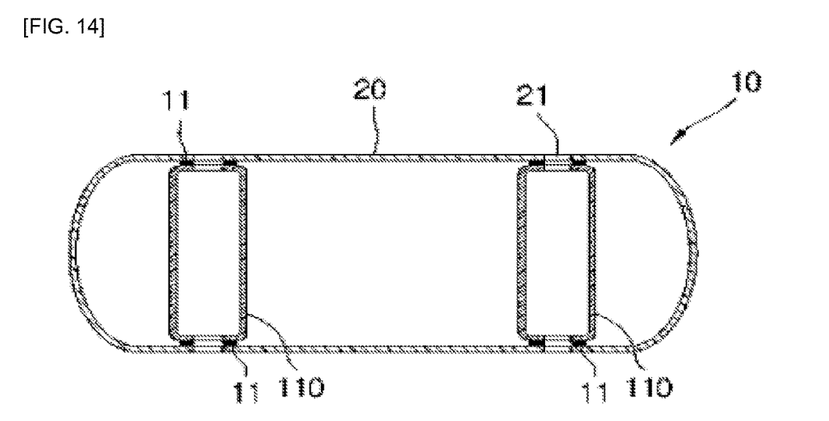
FIG. 14 is a schematic cross-sectional view showing a state in which one unit cell is filled with air.

FIG. 11 is a schematic cross-sectional view showing another embodiment of the present invention, FIG. 12 is a schematic cross-sectional view showing a state in which the periphery of a ventilation hole 21 is welded after the ventilation hole 21 is formed by a hole-processing cutter 70, FIG. 13 is a schematic perspective view showing a state in which a plurality of unit cells 10 is laminated, and FIG. 14 is a schematic cross-sectional view showing a state in which one unit cell 10 is filled with air.

The 3D bellows of the present invention includes a tube-shaped unit cell material 20, in which a plurality of tube-shaped separators 110 smaller than the unit cell material may be disposed. The first adhesion-preventing film 30 is inserted in the separators 110.

As in FIG. 11, when unit cells 10 are prepared and laminated, the hole-processing cutter 70 is operated and form ventilation holes 21 in the unit cell material 20 and the separators 110. When the ventilation holes 21 are formed, the hole-circumference welding heater 80 is operated and welds the circumferences of the ventilation holes 21.

Accordingly, the separators 110 and the unit cell material 20 around the ventilation hole 21 are welded. In this state, though not shown, the first finishing unit cell material 50 and the second finishing unit cell material 60 are positioned on both outermost sides of the unit cell material 20 and then the contours are cut and welded using the contour-processing cutter 90 and the contour welding heater 100.

In this state, when air is injected into the unit cell 10, the inside expands and the separators 110 are folded, so five separated cells are defined in the unit cell 10.

Accordingly, the inside of the unit cell 10 is divided into several sections by the separators 110 and the sections prevent convection in the unit cell 10, so they minimize hot air transmitted to an air mattress or cold air transmitted to a body.

According to the present invention, it is possible to manufacture various shapes of bellows by two-time bonding using the method of welding a bellows, and it is possible to simply manufacture a bellows, for example, which is used for sensors, dust covers, ad lifts.

Figure 15:
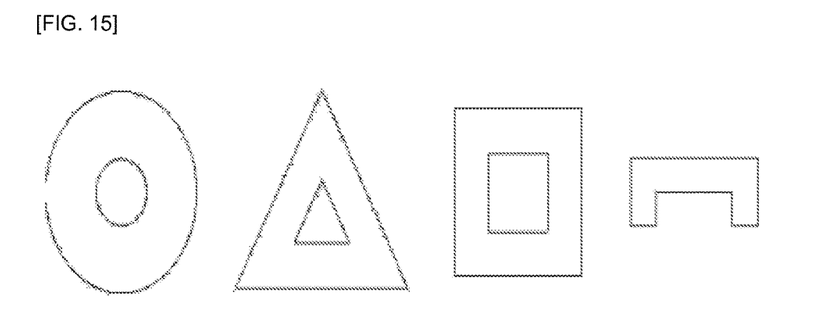
FIG. 15 is schematic plan views showing another embodiment of the present invention.

FIG. 15 is schematic plan views showing other embodiments of the present invention, in which the first bellows from the left size is a donut-shaped bellows with the center and the circumference cut, the second bellows is a triangular bellows with the center and the circumference cut in a triangle, the third bellows is a rectangular bellows with the center and the circumference cut in a rectangle, and the fourth bellows is a U-shaped bellows with the circumference cut in the U-shape.

As described, according to the method of welding a 3D bellows of the present invention, it is possible to simply and quickly manufacture various shapes of bellows.

On the other hand, the second adhesion-preventing film 40 that is polyurethane may be bonded to the unit cell material 20 that is a fabric, in which there is no need for inserting the second adhesion-preventing film 40 between the unit cell materials 20.

Further, according to the present invention, the second adhesion-preventing film 40 may be laminated on a unit cell material 20, the laminated unit cell material 20 may be punched, and a washer made of polyurethane may be welded at the punched portion.

According to the present invention, a unit cell material 20 is laminated, a washer portion is cut by the hole-processing cutter 70, and then the circumference of the cut washer is heated and welded by operating the hole-circumference welding heater 80.

What is claimed is:

1. A 3D bellows including a plurality of unit cells and comprising:
   a first finishing unit cell material that is disposed on a side of two outermost sides of the unit cells and finishes an outermost side of the unit cells;
   unit cell materials that are laminated on the top of the first finishing unit cell material to fit to the number of unit cells to be manufactured and each have a ventilation hole;
   a second finishing unit cell material that is disposed on the other side of the outermost sides of the unit cells and finishes the other outermost side of the unit cells;

an air injection hole that is formed at the second finishing unit cell material to inject/discharge air into/out of the unit cells;

first adhesion-preventing films that are disposed around the ventilation holes of the unit cell materials, are disposed not in all gaps between the unit cell materials, but alternately between the unit cell materials, and prevent thermal welding of the circumferences of the ventilation holes of two unit cell materials adjacent up and down when the circumferences of the ventilation holes are heated; and second adhesion-preventing films that are disposed around the unit cell materials, are disposed not in all gaps between the unit cell materials, but alternately between the unit cell materials, where the first adhesion-preventing films are not disposed, and prevent thermal welding of the perimeters of two unit cell materials adjacent up and down when the perimeters of the unit cell materials are heated.

* * * * *